(No Model.)
J. RAMEY.
COMBINED LAND FURROWER AND MARKER.
No. 504,617. Patented Sept. 5, 1893.
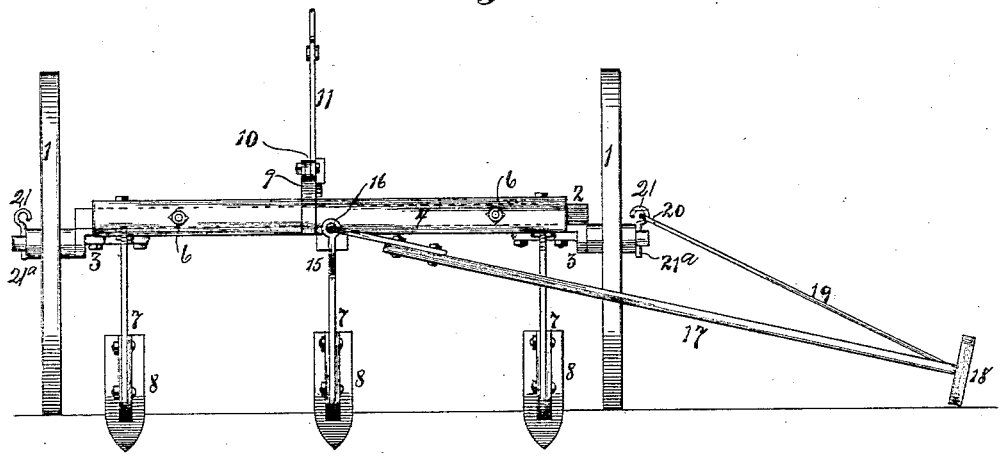
Fig. I.
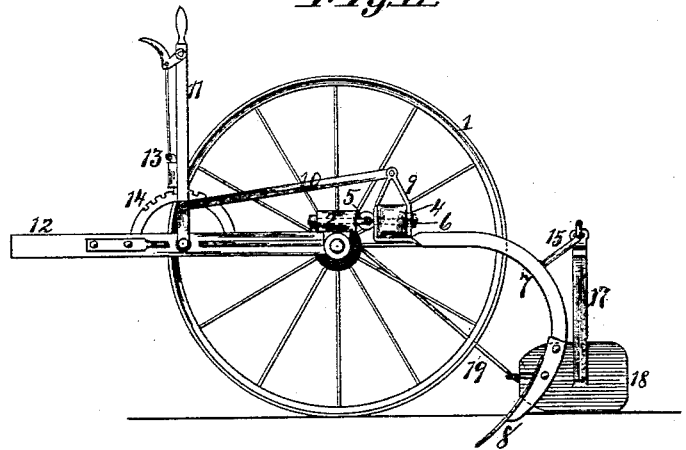
Fig. II.
Attest:
A. M. Ebersole
E. S. Knight
Inventor:
James Ramey.
By Knight Bros
Attys.

UNITED STATES PATENT OFFICE.

JAMES RAMEY, OF BROOKS, ILLINOIS.

COMBINED LAND FURROWER AND MARKER.

SPECIFICATION forming part of Letters Patent No. 504,617, dated September 5, 1893.

Application filed May 29, 1893. Serial No. 475,830. (No model.)

*To all whom it may concern:*

Be it known that I, JAMES RAMEY, of Brooks, in the county of Madison and State of Illinois, have invented a certain new and useful Improvement in a Combined Land Furrower and Marker, of which the following is a full, clear, and exact description, reference being had to the accompanying drawings, forming part of this specification.

My invention relates to a sulky land furrower and marker, intended more especially for laying out furrows for potatoes, and like vegetables, which in planting require to be inserted a considerable depth beneath the surface of the ground; and my invention consists in features of novelty hereinafter fully described and pointed out in the claims.

Figure I is a rear elevation of my improved implement. Fig. II is a side elevation.

Referring to the drawings, 1 represents the wheels connected by an axle composed of a central section 2, to which are secured the spindle portions 3.

4 is a beam connected to the axle by eye-bolts 5 and 6, in respectively the axle and the beam.

Attached to the beam 4 are the shovel bars 7 that carry the shovels 8, which shovels I prefer to make narrow and of considerable length for the reason that a considerable depth for potatoes, &c., is required while there is not required any great width, but merely sufficient width that the seed may be dropped in the furrow, and that the earth from the sides does not fall back and fill the furrow.

Attached to the beam 4 is a bracket 9 to which is pivoted a link 10 that extends forward and is connected to a hand lever 11, pivoted to the tongue 12, the spring pawl 13 on said lever engaging the teeth of the segment bar 14, secured to the tongue 12.

Formed on the central shovel bar 7, is an arm 15 provided with an eye 16 to which is loosely and movably connected the bar 17 of a marker 18, and attached to the forward end of the marker is a retaining rod 19, on whose other end is formed an eye 20, which is loosely held by a hook 21 formed on the upper end of a linch-pin 21ª. It will be observed that the loose connection of the parts of the marker allow of its being moved from side to side of the furrower, the only disconnection required being the disengaging of the rod 19 from the linch-pin 21ª, and the transfer of the rod 19 to the pin on the opposite side, the marker being meanwhile thrown to the opposite side of the implement.

A furrower and marker constructed in accordance with my invention forms an inexpensive, effective and simple implement, which being adjustable and changeable in its parts is thoroughly adapted to accomplish the results for which it is intended.

I claim as my invention—

1. In a land furrower and marker, the combination, with an axle, beam 4 loosely connected to said axle, shovel bars carrying shovels secured to said beam, and a marker loosely connected to one of said shovel bars; substantially as and for the purpose set forth.

2. In a land furrower, the combination with an axle, beam 4 loosely connected to said axle, hand lever and connections for turning said beam, shovel bars carrying shovels secured to said beam, an arm on one of said shovel bars, a marker loosely connected to said arm, and a rod connecting the marker to the axle; substantially as and for the purpose set forth.

JAMES RAMEY.

In presence of—
A. M. EBERSOLE,
BENJN. A. KNIGHT.